United States Patent [19]

Hinsley et al.

[11] Patent Number: 5,295,266
[45] Date of Patent: Mar. 15, 1994

[54] PROGRAM ATTRIBUTE CONTROL IN A COMPUTER SYSTEM

[75] Inventors: Stewart R. Hinsley, Stoke-On-Trent; Christopher D. Hughes, Crewe, both of Great Britain

[73] Assignee: International Computers Limited, London, England

[21] Appl. No.: 958,035

[22] Filed: Oct. 7, 1992

[30] Foreign Application Priority Data

Dec. 20, 1991 [GB] United Kingdom ............ 9127026
Jun. 10, 1992 [GB] United Kingdom ............ 9212337

[51] Int. Cl.$^5$ ................................ G06F 9/44
[52] U.S. Cl. .................... 395/650; 364/DIG. 1; 364/281.3; 364/280; 364/286; 364/286.4
[58] Field of Search ............ 395/650, 700, 800

[56] References Cited

U.S. PATENT DOCUMENTS

| | | | |
|---|---|---|---|
| 4,723,210 | 2/1988 | Barker et al. | 364/900 |
| 4,769,771 | 9/1988 | Lippmann et al. | 364/200 |
| 4,780,821 | 10/1988 | Crossley | 364/200 |
| 4,949,253 | 8/1990 | Chigira et al. | 395/500 |
| 5,075,847 | 12/1991 | Fromme | 395/700 |
| 5,093,918 | 3/1992 | Heyen et al. | 395/725 |
| 5,175,854 | 12/1992 | Cheung et al. | 395/650 |
| 5,204,955 | 4/1993 | Kagei et al. | 395/575 |

*Primary Examiner*—Kevin A. Kriess
*Attorney, Agent, or Firm*—Lee, Mann, Smith, McWilliams, Sweeney & Ohlson

[57] ABSTRACT

In a computer system, each program has a program attribute list associated with it, for associating different aggregates of program attributes with each of a number of invocation contexts in relation to that program. In operation, a process is given attributes depending on the current context/program combination, as determined by the program attribute table for that program. The program attributes may, for example, include a set of privileges and the context may include the identity of the user on whose behalf the program is to be run, so that a program can be given different sets of privileges depending on which user runs the program.

4 Claims, 2 Drawing Sheets

PROGRAM ATTRIBUTE CONTROL IN A COMPUTER SYSTEM

BACKGROUND TO THE INVENTION

This invention relates to a mechanism for controlling program attributes within a computer system, and is particularly, although not exclusively, concerned with a privilege control mechanism for a computer system.

Conventional privilege mechanisms operate on an all-or-nothing basis: either a process is in a privileged state, and has the ability to perform all restricted actions, or else it is in a non-privileged state, and cannot perform any of these actions. Other conventional privilege mechanisms provide finer granularity of privilege control by associating a set of privileges with each program that needs those privileges and can be trusted not to abuse them.

One object of the present invention is to improve on these conventional privilege mechanisms.

SUMMARY OF THE INVENTION

According to the present invention there is provided a computer system having a plurality of programs and comprising: means for creating a program attribute list for each of said programs, for associating different aggregates of program attributes with each of a number of invocation contexts in relation to that program, and means for creating a process and for giving that process attributes depending on the current context/program combination, as determined by the program attribute list for that program.

It can be seen that the invention thus allows a program to be given different sets of attributes depending on the invocation context. In particular, the program attributes may include a set of privileges, and the invocation context may include the identity of the user on whose behalf the program is to be run, so that a program can be given different sets of privileges depending on which user runs the program.

DESCRIPTION OF AN EMBODIMENT OF THE INVENTION

One privilege mechanism in accordance with the invention will now be described by way of example with reference to the accompanying drawings.

Figure 1:
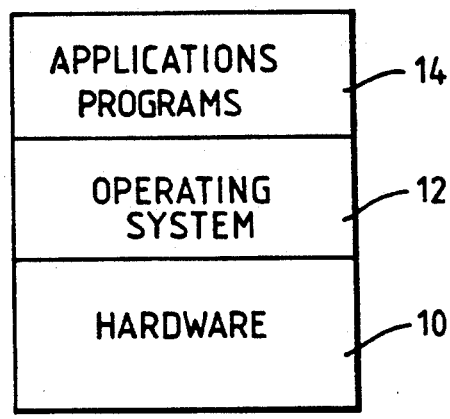
FIG. 1 is a block diagram of a computer system embodying the invention.

Referring to FIG. 1, the computer system comprises computer hardware 10, an operating system 12, and user applications programs 14.

The computer hardware 10 may, for example, be an ICL DRS 6000 computer, supplied by International Computers Limited, running under a UNIX operating system. (UNIX is a registered trademark of UNIX System Laboratories Inc). The applications programs may comprise conventional database, word processing and spreadsheet programs.

Privilege Sets

Figure 2:
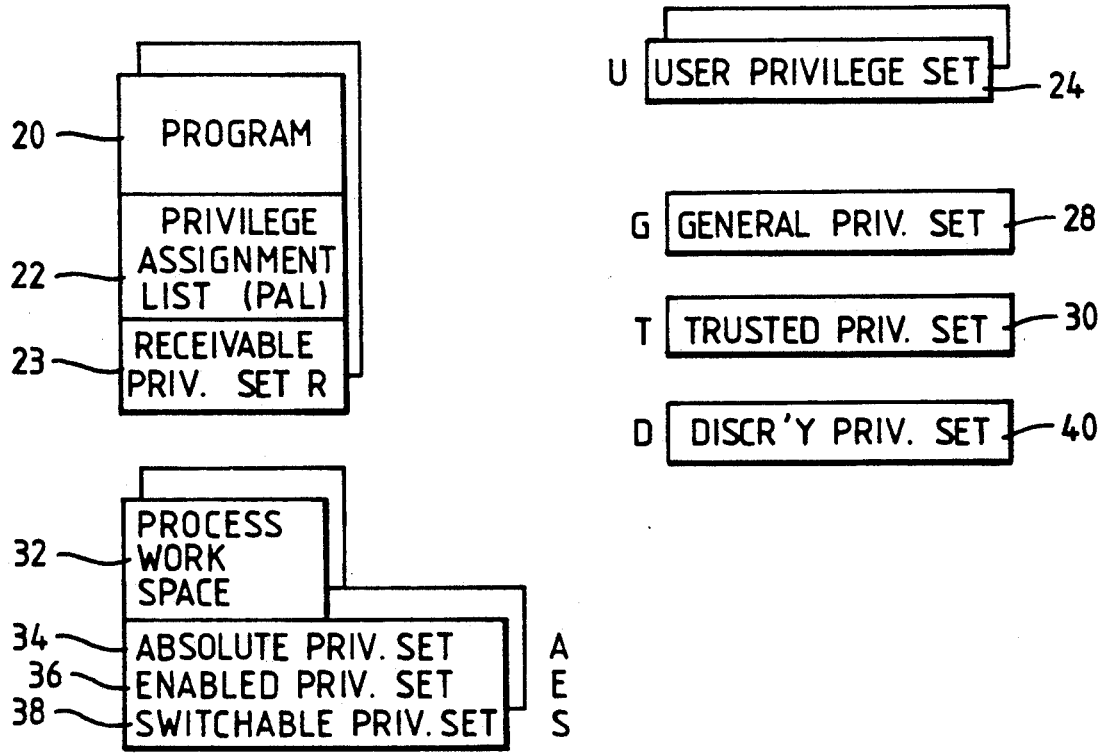
FIG. 2 is a schematic block diagram showing the various data structures used by the privilege mechanism in the system.

Referring now to FIG. 2, the privilege mechanism in the system uses a number of data items referred to herein as privilege sets. Each privilege set comprises a set of bits, each bit being associated with a particular privilege. For example, one bit, when set, may grant the privilege to change access control attributes, another bit, when set, may grant the privilege to directly control hardware peripherals, and so on.

Each file 20 containing a program has a data structure referred to as a program attribute list (PAL) 22 associated with it. The PAL comprises a sequence of entries each entry comprising a user identification number (UID) and a privilege set (P) indicating the privileges associated with the program when used by that particular user. Thus, it can be seen that different privileges can be granted to different program/user combinations. Each program file 20 also has a receivable privilege set (R) 23 associated with it. This specifies the maximum set of privileges that the program may, when executed, inherit from the program that executes it.

Each user role in the system has an associated user privilege set (U) 24 indicating the privileges granted to that role that may be selectively enabled or disabled by that role.

In addition to the above privilege sets, the system also maintains two privilege sets for the system as a whole, referred to as the general privilege set (G) 28, and the trusted privilege set (T) 30. The general privilege set G contains the privileges that are granted to all processes in the system. The trusted privilege set T contains the privileges that are available only to processes running in a trusted mode. Clearly, these two sets G and T must be non-intersecting, i.e. no privileges are present in both sets.

In the UNIX operating system, a process is an instance of a program in execution. Several processes may be active at any given time. Each active process is assigned a process work space 32 which contains various process attributes and parameters.

In the present embodiment, each process work space 32 has three privilege sets associated with it: an absolute set (A) 34, an enabled set (E) 36 and a switchable set (S) 38. A discretionary privilege set (D) 40 is also maintained.

The absolute set A contains the privileges associated with the process that cannot be disabled. The switchable set S contains the privileges associated with the process that may be selectively enabled or disabled by that process. The enabled set E contains those privileges that are actually enabled at any given time. Thus, it can be seen that the sets A and S must always be non-intersecting, and the set E must be a subset of the union of sets A and S. Also, it should be noted that, for untrusted processes, the sets A, E and S must all be non-intersecting with the set T, i.e. they must not contain any of the privileges specified by the trusted set.

The operating system 12 may be a conventional UNIX operating system, apart from modifications required to implement the privilege mechanism. Hence, it is not necessary to describe the structure of the operating system in detail, and only the modifications required to implement be privilege mechanism will be described herein.

Initialisation of Process Privilege Sets

Figure 3:
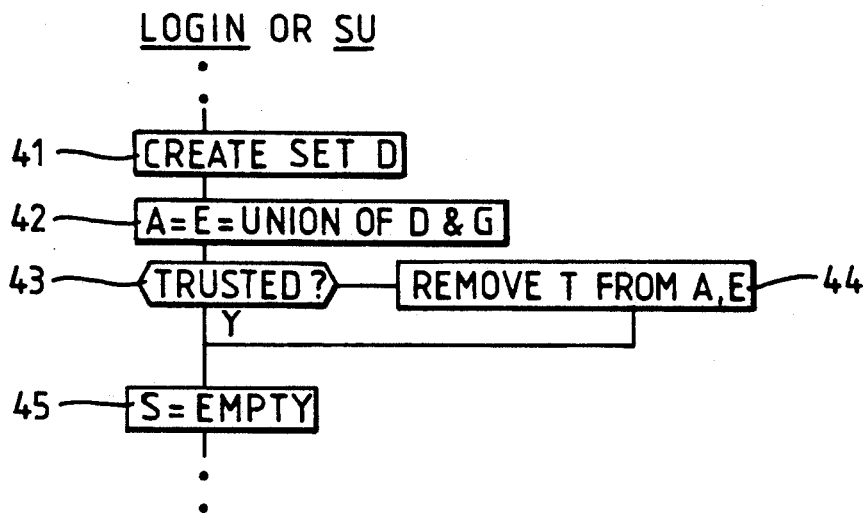
FIGS. 3 and 4 are flow charts illustrating the privilege mechanism.

In UNIX, a user session can be commenced or reconfigured by performing either a login or a su program. These two programs are modified to perform the following actions upon commencement of a user session, as illustrated by FIG. 3.

A discretionary user privilege set (D) is created (41), this set being initially empty. The user has the option to specify which of the privileges from the user set U are to be enabled in the discretionary set D. Thus, the set D must always be a subset of U. It can be seen that, because the set D has an empty default value, the user must always take positive action to obtain privileges, which reduces the likelihood that the user will obtain privileges that the does not actually need.

The absolute and enabled privilege sets A and E of the current process are both set (42) to the union of the sets D and G, i.e. they are given all the discretionary privileges selected by the current user, and all the general privileges that are granted to all users. If the current process is not a trusted one (43), any privileges contained in the trusted set T are then removed (44) from the sets A and E. The switchable set S is initialised (45) to an empty state.

Inheritance of Process Privilege Sets

In UNIX, a new process is created as the result of a fork. A process has a new program loaded into it as the result of or an exec system call. In the present system, these two system calls are modified to control the inheritance of the privilege sets, as follows.

In the case of a fork, the child process inherits all the privilege sets of the parent, without any modification of the privilege sets.

Figure 4:
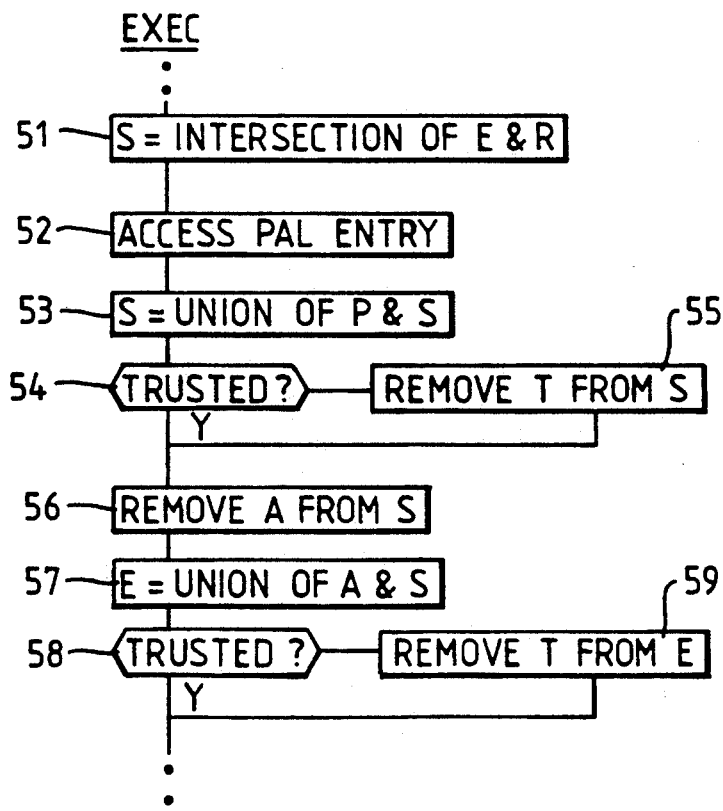

In the case of an exec, the privilege sets A, E and S of the process are given values as follows, as illustrated by FIG. 4.

The absolute set A is unchanged. That is, the process retains all the absolute privileges.

The receivable privilege set R of the program to be executed is accessed and the intersection of this set with the enabled privilege set E of the current process is used (51) to initialise the switchable privilege set S of the process. Thus the new process inherits privileges from the old one that are both enabled by the old process and receivable by the new.

The PAL of the program to be executed is then accessed (52), and the privilege set P for the current user is located. The switchable set S of the new process then has this privilege set P added to it (53). If the process is not a trusted one (54), then any privileges in set T are removed (55) from S. Also, any privileges in A are removed (56) from S, to ensure that the sets A and S remain non-intersecting.

The enabled privilege set E of the process is set (57) equal to the union of sets A and S. In other words, all absolute and switchable privileges are initially enabled whether they are inherited or granted by the user/program combination. If the process is not a trusted one (58) then any privileges in set T are removed (59) from E.

If at any time the trusted status of a trusted process is relinquished, then the privileges in set T are removed from sets A, E, and S.

Privilege Control

All the UNIX functions that are required to be protected by the privilege mechanism are modified to include a test which ascertains whether the enabled privilege set E of the current process includes the privilege required for using the function in question. If so, the function is permitted. If not, the function is not allowed, and an entry is a made in the system audit log to record that an attempt has been made to use the function.

Examples of UNIX functions that are modified in this way are nice, which increases the priority of a specified process, and chroot which changes the root directory.

Enabling/disabling privileges

A new system call enpriv is provided to allow a program to enable or disable any of the privileges in the switchable privilege set S of the current process. When a privilege is enabled, it is added to the enabled privilege set E. Conversely, when a privilege is disabled, it is removed from the set E.

Preferably, programs are structured in such a way that they enable the required privileges only when they actually need them and relinquish those privileges when they are no longer required. This ensures greater protection for the system integrity.

PAL Assignment

A new system call setpal is provided, to enable a user to assign a PAL to a program. Use of the system call itself requires privilege.

Program Modification

The UNIX functions creat and open can be used to create or modify a program file.

Both of these functions are modified so that, whenever they are applied to an existing privileged program, the PAL associated with that program is destroyed. A new PAL must then be assigned to the program, using setpal, if the program is to have any privileges.

This ensures that the assignment of PALs is always performed in a controlled manner, and that privileges cannot be used in an unauthorised manner by modifying existing privileged programs.

What is claimed is:

1. A computer system having a plurality of programs and comprising: means for creating a program attribute list for each of said programs, for associating different aggregates of program attributes with each of a number of invocation contexts in relation to that program, and means for creating a process and for giving that process attributes depending on the context/program combination, as determined by the program attribute list for that program, said program attribute list being unmodified by performance of said process.

2. A system according to claim 1 wherein the program attributes in each said program attribute list comprise a privilege set indicating privileges (if any) to be associated with the program.

3. A system according to claim 1 wherein said invocation context comprises the identity of the user on whose behalf the program is to be run.

4. A system according to claim 1 including means operated whenever a program is modified for destroying the program attribute list associated with that program.

* * * * *